United States Patent [19]

Egger et al.

[11] 4,421,469

[45] Dec. 20, 1983

[54] INJECTION MOLDING MACHINE ASSEMBLY HAVING MEANS FOR SELECTIVELY CHANGING AT LEAST TOOL UNIT OR A PLASTICIZING AND EJECTION UNIT

[75] Inventors: Caspar Egger, Glarus; Rudolf Krebser, Schübelbach; Hans Leuzinger, Netstal, all of Switzerland

[73] Assignee: Netstal-Maschinen AG, Switzerland

[21] Appl. No.: 391,289

[22] Filed: Jun. 23, 1982

[30] Foreign Application Priority Data

Jul. 2, 1981 [CH] Switzerland .......................... 4374/81

[51] Int. Cl.$^3$ .............................................. B29F 1/00
[52] U.S. Cl. .................................... 425/183; 425/186; 425/190
[58] Field of Search ............... 425/182, 183, 185, 186, 425/190, 192 R

[56] References Cited

U.S. PATENT DOCUMENTS 3,663,136  5/1972  Westermann ................... 425/186 X

FOREIGN PATENT DOCUMENTS 56-70925  6/1981  Japan ................................. 425/542

Primary Examiner—Thomas P. Pavelko
Attorney, Agent, or Firm—McGlew and Tuttle

[57] ABSTRACT

An injection molding machine assembly for use with an operating injection machine comprises a tool unit mounting support adjacent the injection machine, a plasticizer and ejection unit mounting support adjacent the mounting support for the tool unit. Each support has associated with it a coupling element for connecting the associated tool unit or plasticizer and ejector into an operative condition or into a standby heating condition, for example. In addition there is a magazine which has at least one additional support for either or both of a tool unit and an ejection and plasticizing unit. An ejector and plasticizer is advantageously provided on a mounting support as well as in a magazine support. In addition a tool unit is provided on the mounting support or in the magazine support. A transport unit is associated with the magazine and tool in the ejector mountings and is movable between them for transporting one or both of a plasticizer and ejector or a tool unit to the mounting support in the operating position as desired. The construction advantageously includes a control for automatically effecting the transportation and the coupling of the units in the operating position adjacent the injection molding machine.

7 Claims, 2 Drawing Figures

INJECTION MOLDING MACHINE ASSEMBLY HAVING MEANS FOR SELECTIVELY CHANGING AT LEAST TOOL UNIT OR A PLASTICIZING AND EJECTION UNIT

FIELD AND BACKGROUND OF THE INVENTION

The present invention relates in general to plasticizing and injection devices and particularly to a new and useful assembly comprising at least one injection molding machine and equipment for exchanging the tool unit and plasticizing unit of the machine.

It is known that a manual exchange of the tool unit and/or the plasticizing and injection unit, which becomes necessary if the product or the molded material is to be changed or inspected, is very time consuming and complicated. That is why devices have already been provided which are permanently associated with the respective unit and capable of automatically dismounting and removing it, and substituting therefore another one. The exchange of the respective unit can be effected by the associated devices automatically, i.e. without manual interference and relatively quickly. However, since the known devices are associated with each specific unit, the design and control are complicated and mostly even hinder the access to the machine.

SUMMARY OF THE INVENTION

The present invention is directed to an injection molding machine which is equipped with an exchange device comprising only few mechanisms which do not prevent access to the machine units during operation and, in addition, are controllable in a relatively simple manner.

In accordance with the invention the injection machine assembly includes at least one injection molding machine and a device for exchanging the tool unit and the plasticizing unit of the machine. The construction includes a frame by which the injection molding machine and a magazine for additional units is surrounded and on which a transporting device is movable for selective engagement with a plasticizing unit or a tool unit for moving them from the magazine to the mounting base adjacent the injection molding machine or back to the magazine as desired. The mounting base adjacent the injection molding machine includes couplings which may be automatically engaged connecting the plasticizing and ejection machine or the tool device to an operative association with the necessary supply or rotating units as desired. The transporting device advantageously comprises a trolley which is movable longitudinally on a laterally shiftable frame. The trolley carries suitable hoisting elements which may be engaged with a coupling web secured either to a tool unit or to a plasticizer or ejector unit so that either of these units may be shifted back and forth between a mounting base and a magazine.

The gripping mechanism can thus be moved within the frame in any spatial direction; it may be moved above the unit to be exchanged and lowered thereto, grip the unit, and, upon disengaging the couplings, carry it to and deposit it on the storage seat. Vice Versa, a unit may be taken from the magazine to be put in place in the machine. For actuating the different couplings, such as the couplings between the screw and the drive shaft of the plasticizing unit, between the injector and the actuator thereof in the tool unit, and between the different heating and/or pressure fluid connections as well as electrical connections, hydraulic or pneumatic devices have proved particulary advantageous.

It is advisable to provide in the magazine two adjacent storage seats for the respective units, about laterally aligned with the locations where the units are mounted on the machine, with one of the seats being occupied by a unit ready to be mounted, while the other seat is ready to receive the unit to be dismounted. These storage seats are advantageously provided with operating connections, such as for the heating and/or cooling fluid, to which the unit can be connected by means of corresponding couplings.

The inventive assembly makes it possible to effect a necessary change entirely automatically and within a shortest time without any manual intervention, while hardly affecting the accessibility of the machine and the magazine, owing to the spatial mobility of the gripping mechanism serving both of the units.

Accordingly, it is an object of the invention to provide an injection molding machine assembly for use with an operating injection machine which comprises a tool unit mounting support adjacent the injection molding machine and a plasticizer and ejector unit mounting support adjacent the tool unit mounting support with first operating and securing coupling means associated with each support for overatively connecting the tool unit or the plasticizer and ejection unit so that it can be used with the operating injection machine. Further including a magazine defining at least one additional support for either an additional tool unit or an additional plasticizer and ejection unit with transport means movable between the magazine and at least one of the supports for transporting at least one of the plasticizer and ejection unit or the tool unit between the associated mounting support in the magazine.

A further object of the invention is to provide an injection molding machine assembly which is simple in design, rugged in construction and economical to manufacture.

The various features of novelty which characterize the invention are pointed out with particularly in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
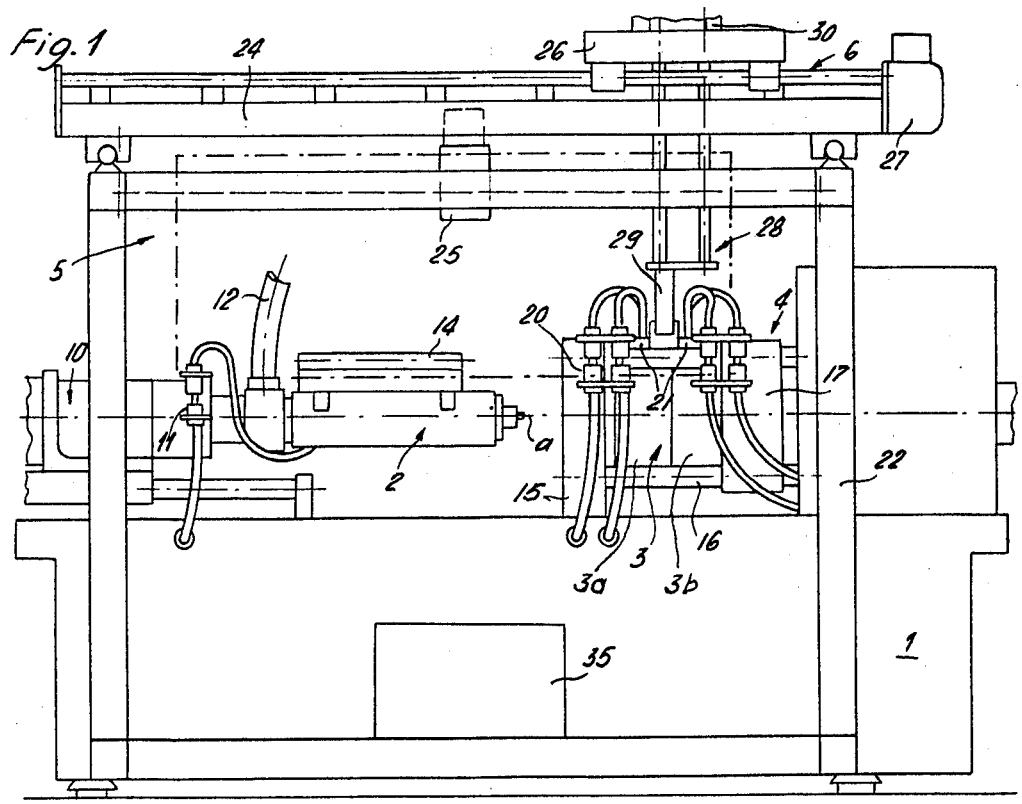
FIG. 1 is a side elevational view of an injection molding machine taken along the line B—B of FIG. 2 and constructed in accordance with the invention.

Referring to the drawings in particular the invention embodied therein comprises an operating injection molding machine assembly including the injection machine 1 which is connected to a tool unit 3 which is operatively associated in turn with a plasticizer and ejector 2. The tool unit 3 is mounted on a mounting support adjacent the injection molding machine 1 and in the embodiment of the invention shown it comprises a mold assembly mounted between a support plate 15 and a movable support plate 17. The plasticizer and ejection unit is mounted adjacent the tool unit for operative association therewith. In accordance with the invention magazine means 7 are provided which define at least one additional mounting support for either or both of an additional plasticizer and ejector or tool unit. Transport means in the form of transport mechanism generally designated 6 includes a trolley 26 which is movable between the magazine 7 and at least one of the mounting supports to facilitate a selective transfer of a tool unit or a plasticizer and ejector to either an operative position or to a magazine position in the standby location.

The shown assembly is an injection molding machine 1 for plastics, comprising, in a manner known per se, a horizontally extending plasticizing and injection unit 2, and a moving and closing mechanism 4 substantially formed by a two-part tool unit 3, having parts 3*a* and 3*b*, and an exchange device 5 including a transporting mechanism 6 and a magazine 7 for units, and serving the purpose of pneumatically exchanging the plasticizing unit 2 or the tool unit 3, if needed.

The plasticizing unit 2 comprises a feed screw (not shown) and is fixed to the machine frame by means of pneumatically disengageable clamping elements 8. The screw of plasticizing unit 2 is connected through an automatically engageable and disengageable coupling 9 to a screw drive 10 producing the torque and thus the axial force. Another automatically engageable and disengageable coupling 11 connects the plasticizing unit 2 to the corresponding heat supply connection. At 12 in FIG. 1, a closable line for supplying the granular plastic is shown, leading to an inlet 13 of the plasticizing cylinder and being movable out of alignment with the inlet. On the top of plasticizing unit 2, a coupling web 14 is provided for facilitating the shifting of the unit.

Opposite the nozzle end of the plasticizing unit 2, and coaxially of the working axis a thereof, a fixed mold supporting plate 15 is provided which, in a usual manner, is acted upon by tie rods 16 which are anchored to the housing of the closing unit 4, and on which the movable mold supporting plate 17 is guided. Movable supporting plate 17 further carries an ejector which is coupled through an automatically engageable and disengageable coupling 18 to a transfer bolt which is connected to an ejector plate provided with pins. By means of disengageable clamp elements 19, the two mold parts of tool unit 3 are secured to the two mold supporting plates 15,17. The mold parts are connected through automatically engageable and disengageable couplings 20 to corresponding energy connections of the machine (for example for heating or cooling). On the top of the mold parts of tool unit 3, coupling webs 21 are provided (corresponding to the coupling web 14 of plasticizing unit 2).

The exchange device 5 associated with injection mold machine 1 comprises a frame structure 22 having a rectangular outline and surrounding both the injection molding machine 2 and 3 and an adjacent space serving as a magazine 7 for standby units. On the upper cross members 23 and 23' of frame 22 extending perpendicular to the machine axis a, a bridge crane 24 is mounted (FIG. 1) for displacement across the area spanned by the frame by means of a motor 25, for example through a chain driven by the motor shaft. Bridge crane 24 supports a trolley 26 which is displaceable parallel to the machine axis by means of a motor 27, again through a chain, for example. Trolley 26 carries a hoist 28 whose vertically movable supporting arm is equipped on its lower end with a gripping mechanism 29. Hoist 28 is driven by an electric motor 30. Gripping mechanism 29 is intended to cooperate with coupling webs 14,21.

Figure 2:
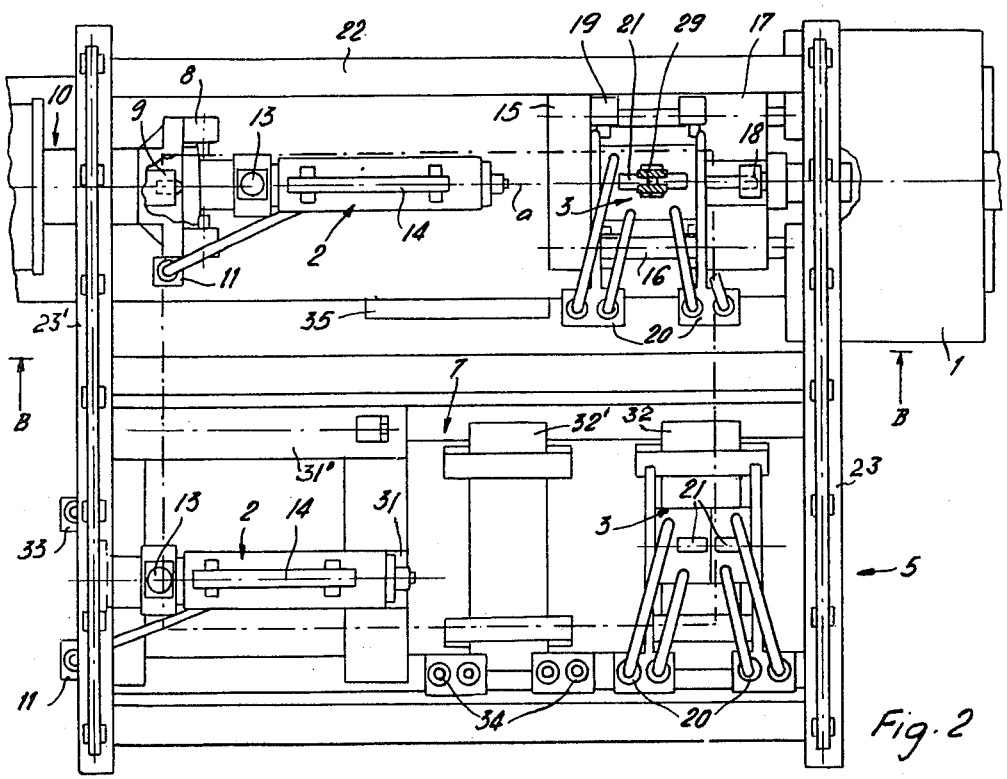
FIG. 2 is a top plan view of the machine shown in FIG. 1 with the bridge crane transport element removed.

As shown in FIG. 2, magazine 7 which occupies a space adjacent machine 1 but within the area covered by the motion of trolley 26, is designed with two spaced apart storage seats 31 and 31' which are provided abreast of plasticizing unit 2 mounted on the machine, and intended as standby locations for a plasticizing unit, and with two storage seats 31 and 32 provided opposite the mounted tool unit 3 and intended for tool units. To avoid unnecessary vertical movements, seats 31 and 31' and 32 and 32' are advantageously provided approximately at the level of the supports of the respective units 2 and 3 on the machine. Adjacent to the seats 31 and 32, energy supply connections 33,34 are provided for the corresponding couplings 11,20 of units 2,3. By means of these connections, the standby units may be prepared for operation, for example preheated.

All the moving and actuating mechanisms which are to be effective for the automatic exchange of the units, thus for example, the mechanism for actuating the different couplings, clamping elements, and for supplying the granular plastic, as well as the closing mechanism and the motors, are connected to a common control 25, so that an entirely automatic exchange operation is ensured.

If now, a tool unit 3 is to be exchanged, control 35 causes bridge crane and trolley 26 to move above the tool unit which is held in closed position between mold plates 15,17 of the injection molding machine. The vertically movable arm of hoist 28, with gripping mechanism 29 open, is lowered to and engages coupling webs 21 of tool unit 3. Already during the downward motion of gripping mechanism 29 or at the engagement of the webs at the latest, the energy supply to the tool parts is stopped by disengaging coupling 20. Thereupon, gripping elements 19 disengage from tool unit 3. Coupling 18 between the ejector 1 and the transfer bolt also is disengaged. Movable mold plate 17 is then retracted, i.e. closing unit 4 is opened. The tool unit 3 thus hangs freely from the vertically movable supporting arm of hoist 28, and is hoisted. Next the removed tool unit 3 is carried by the trolley 26 and the crane 24 above the empty storage seat 32' in the magazine and lowered thereto. By means of the coupling 20, the tool unit is then connected to energy supply connections 34 (for example, for heating or cooling) and, if necessary, kept at the operating temperature or brought later to that temperature again. Gripping mechanism 29 releases coupling webs 21 of the tool unit and the supporting arm is lifted. Crane 26 moves above the other magazine seat 32 where a new tool unit 3 to be mounted is received, and gripping mechanism 29 engages thereon. Energy supply couplings 20 are disengaged and the tool unit, which has been brought in the magazine to the operating temperature, is released. Supporting arm now hoists the new tool unit 3 to the mounting location of closing unit 4. There, the tool unit is firmly coupled by automatic clamping element 19 to mold plate 15 at the nozzle side, then movable mold plate 17 is moved to the corresponding clamping surface of the tool unit and also coupled fast. Next, energy supply couplings 20 between the machine and tool unit are engaged and coupling 18 of the ejector into which the transfer bolt of the tool unit has been introduced by moving mold plate 17, is non-positively engaged.

The tool unit is thus made ready for operation.

In a similar way, the plasticizing unit 2 can be exchanged. Crane 24 and trolley 26 are moved above coupling web 14 of mounted plasticizing unit 2. Supporting arm carrying gripping mechanism 29 is lowered and coupling web is engaged. In the meantime, energy supply coupling 11 is released. Further, during the same period of time, screw coupling 9 is disengaged and a line 12 for supplying granular plastic, which has been closed already prior to the last injection, is swung away, so that clamping element 8 can disengage from the plasticizing unit 2. Trolley 26 now lifts unit 2 and carries it into magazine 7 to deposit it on empty seat 31'. Energy supply coupling 11 is then coupled to the associated connection 33, to keep the unit at a proper temperature or bring it to the desired temperature prior to mounting. Gripping mechanism 29 releases plasticizing unit 2 and is moved and coupled in the magazine to the new plasticizing unit to be mounted. In reverse order, the new plasticizing unit 2 is put in place in the machine and fixed. The machine is again ready for operation and the manufacturing process is restarted, for example by an instruction from the control computer 35.

In addition to gripping mechanism 29, another arm of reduced weight and equipped with another gripping mechanism may be provided on the vertically movable supporting arm of hoist 28, which, in a corresponding position above closing unit 4, may remove the moldings from the tool unit during the manufacturing process and deposit them in proper sequence on a conveyor, for example. Such a second arm, of course, may also be suspended directly from the trolley.

Another possibility is to enlarge the traveling area of bridge crane 24, to serve with the same exchange device a plurality of ejection molding machine with the magazine for the tool and plasticizing units of all the machines being concentrated to one location. Then, the units might be preheated at a special station to have them at the operating temperature immediately after mounting them in place on the machine, and be able to instantly start the manufacturing process.

If necessary, of course, only the tool unit or only the plasticizing unit may be exchanged.

While a specific embodiment of the invention has been shown and described in detail to illustrate the application of the principles of the invention, it will be understood that the invention may be embodied otherwise without departing from such principles.

What is claimed is:

1. An injection molding machine assembly for use with an operating injection machine, comprising a tool unit mounting support adjacent the injection machine, a plasticizer and ejection unit mounting support adjacent said tool unit mounting support, first operating and securing coupling means associated with said tool unit mounting support for connecting a tool unit, second operating and securing coupling means associated with said ejection unit mounting support for connecting a plasticizer and ejection unit, magazine means defining at least one of an additional plasticizer and ejection unit mounting support which is substantially the same as said plasticizer and ejection unit mounting support, the first ejector and plasticizer associated with said injection unit mounting support, a first tool unit associated with said tool unit mounting support, said first ejector and plasticizer associated with said magazine means, and transport means movable between said magazine, said plasticizer and ejection unit mounting support for transporting said first ejector and plasticizer between said plasticizer and ejection unit mounting support and said magazine means.

2. An injection molding machine according to claim 1 wherein said magazine means includes both at least one additional one of said tool unit mounting support and said ejection unit mounting support and including control means connected between said magazine means and said first and second operating and securing coupling means for automatically transporting and coupling and uncoupling said plasticizer and ejector in said tool unit.

3. An injection molding machine according to claim 2, wherein said transport means comprises a bridge crane and including a frame supporting said tool unit mounting support, said plasticizer and ejection unit mounting support and said magazine means, said bridge crane traveling on said frame, a trolley movable backward and forwardly on said bridge frame, said plasticizer and ejection unit and said tool unit and said injection machine lying on a common access, said trolley being movable transverse to said access and including a hoisting mechanism associated with said trolley having a vertically movable supporting arm, and gripping means associated with said supporting arm.

4. An injection molding machine according to claim 3, wherein said first operating and securing coupling means and said second operating and securing coupling means include coupling webs intended to cooperate with said gripping mechanism.

5. An injection molding machine according to claim 1, wherein said magazine means include at least two mounting supports for said tool unit and said plasticizer and ejection unit, said first and second operating and securing coupling means including energy supply connections.

6. An injection molding machine according to claim 1, wherein said magazine means includes a plurality of plasticizer and ejection unit mounting supports.

7. An injection molding machine according to claim 1, wherein said transport means includes a gripping mechanism for continuously removing moldings produced by said injection molding machine.

* * * * *